(12) United States Patent
Baird et al.

(10) Patent No.: US 8,141,348 B2
(45) Date of Patent: Mar. 27, 2012

(54) ENGINE AFTER-TREATMENT CONTROLS USING DOSING BELOW CATALYST LIGHT-OFF TEMPERATURE

(75) Inventors: Matthew T. Baird, Canton, MI (US); Amr M. Radwan, Canton, MI (US); Kevin D. Sisken, Saline, MI (US); Bryant C. Pham, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 873 days.

(21) Appl. No.: 11/962,645

(22) Filed: Dec. 21, 2007

(65) Prior Publication Data

US 2009/0158707 A1    Jun. 25, 2009

(51) Int. Cl.
*F01N 3/00* (2006.01)

(52) U.S. Cl. ............... 60/286; 60/274; 60/287; 60/295

(58) Field of Classification Search .................. 60/286
See application file for complete search history.

(56) References Cited

U.S. PATENT DOCUMENTS

| | | | |
|---|---|---|---|
| 6,240,724 B1 * | 6/2001 | Kudou et al. ................ 60/284 |
| 6,594,990 B2 * | 7/2003 | Kuenstler et al. ............ 60/295 |
| 7,076,945 B2 | 7/2006 | Sisken et al. |
| 2005/0217251 A1 * | 10/2005 | Sato et al. ................... 60/295 |
| 2005/0252197 A1 * | 11/2005 | Nieuwstadt et al. .......... 60/277 |
| 2006/0201144 A1 * | 9/2006 | Gabe et al. .................. 60/299 |
| 2006/0288689 A1 * | 12/2006 | Shimoda ..................... 60/275 |
| 2007/0101698 A1 * | 5/2007 | Goulette et al. ............. 60/284 |

* cited by examiner

*Primary Examiner* — Thomas Denion
*Assistant Examiner* — Jason Shanske
(74) *Attorney, Agent, or Firm* — Reising Ethington P.C.

(57) ABSTRACT

A method of controlling dosing of a hydrocarbon fuel into the exhaust gas of a combustion engine upstream of a particulate filter when the exhaust gas temperature into an oxidation catalyst upstream of a particulate filter has dropped below the light-off temperature of the catalyst.

14 Claims, 2 Drawing Sheets

ENGINE AFTER-TREATMENT CONTROLS USING DOSING BELOW CATALYST LIGHT-OFF TEMPERATURE

TECHNICAL FIELD

The field to which the disclosure generally relates includes methods of treating internal combustion engine exhaust constituents.

BACKGROUND

Internal combustion engine after-treatment systems utilizing a hydrocarbon doser rely on a certain level of exhaust temperature into the after-treatment components before hydrocarbons can be oxidized or combusted. The temperature level is typically determined by inlet temperature to the after-treatment assembly.

SUMMARY OF EXEMPLARY EMBODIMENTS OF THE INVENTION

One embodiment of the invention includes a method of operating an internal combustion engine system comprising an engine, an oxidation catalyst, and a particulate filter; the method comprising: determining the outlet temperature of exhaust gas from the oxidation catalyst and dosing the exhaust gas with a hydrocarbon if the outlet temperature of the oxidation catalyst is above a first temperature.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
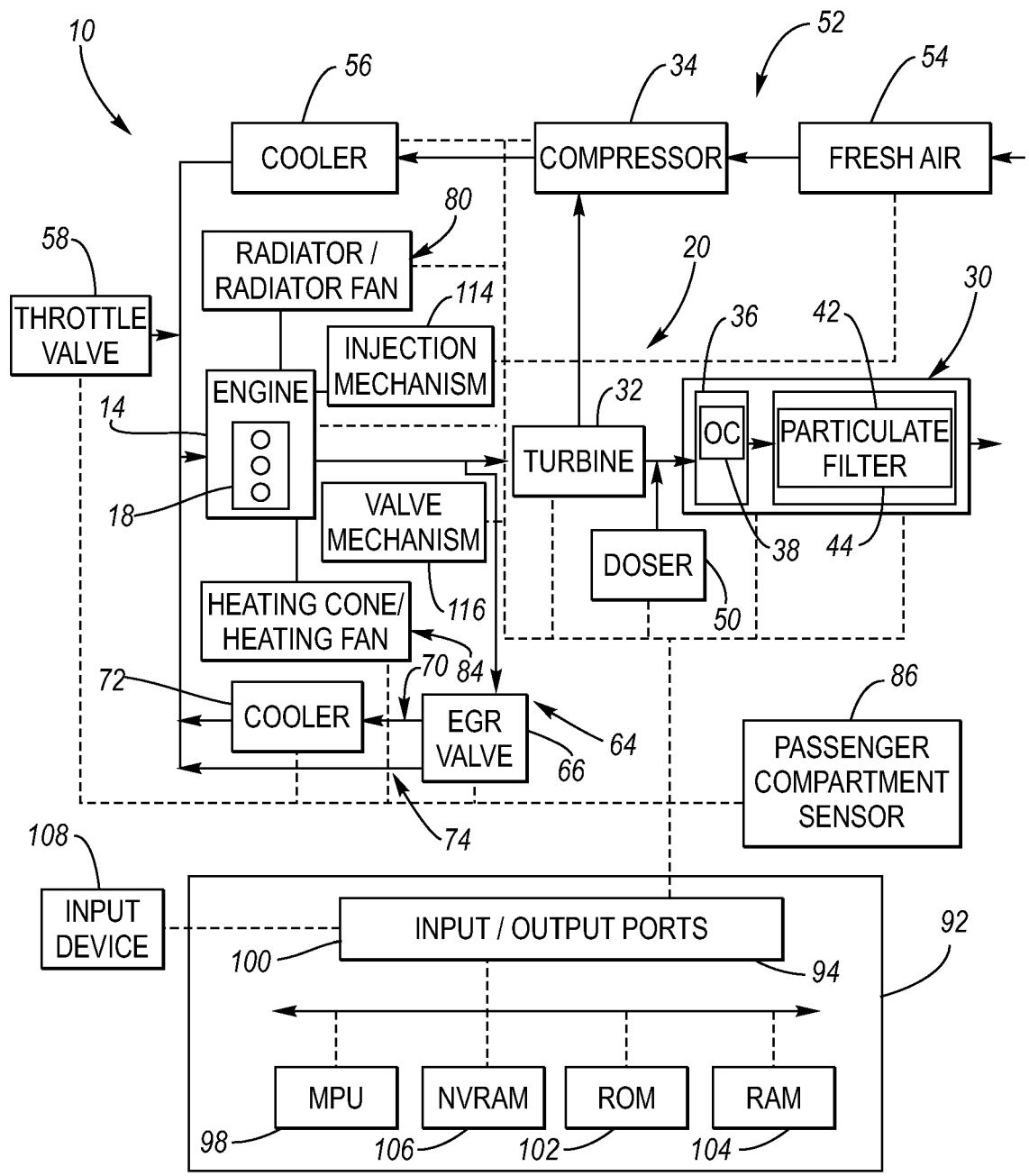
FIG. 1 is a schematic illustrative of one embodiment of a system useful in carrying out a method according to one embodiment of the invention.

FIG. 1 is a schematic illustrative of one embodiment of a product or vehicle powertrain system 10, the components of which may be useful in a method according to one embodiment of the invention. The system 10 may be utilized to provide power for vehicles, including but not limited to, on-highway trucks, construction equipment, marine vessels, stationary generators, automobiles, trucks, tractor-trailers, boats, recreation vehicles, light and heavy duty work vehicles, and the like.

The system 10 includes a combustion engine 14 which may be powered by any of a variety of fuels, including but not limited to gasoline or diesel fuels. The engine 14 may include a number of cylinders 18 into which the fuel and air are injected for ignition.

Exhaust gases generated by the combustion engine 14 exit the engine through the exhaust system 20. The exhaust system 20 may include a variety of components including an exhaust manifold and passageways to deliver the exhaust gases to a particulate filter assembly 30, which may be but is not limited to a diesel particulate filter. Optionally, the system 10 may include a turbocharger including a turbine 32 and a compressor 34 which may be a variable geometry turbocharger (VGT) and/or a turbo compound power turbine.

The particulate filter assembly 30 may be configured to capture particulates associated with the combustion process. The particulate assembly 30 may include an oxidation catalyst (OC) canister 36 which includes an OC 38, and a particulate filter canister 42 which includes a particulate filter 44. The canisters 36,42 may be separate components joined together with a clamp or the canisters 36, 42 may be separately serviceable.

The OC 38 may be utilized to oxidize hydrocarbons and carbon monoxide present in the exhaust gases and the oxidation may result in an increase in the temperatures at the particulate filter 44. Particulate filter 44 may capture particulates present in the exhaust gases, such as carbon, oil particulates, ash and the like. The particulate filter 44 may be regenerated by burning or oxidizing the captured particulates if the temperatures of the particulate filter 44 or exhaust gases flowing therethrough are sufficiently high. As such, the particulates may be stored in the particulate filter 44 until such time as it is desired to oxidize the particulates by raising the temperature of the particulate filter at or above a predetermined temperature. The canisters 36, 42 may include inlets and outlets having defined cross-sectional areas with expansive portions therebetween to store the OC 38 and the particulate filter 44 respectively.

To facilitate oxidation of the captured particulates, a doser 50 may be included to inject fuel into the exhaust gases or onto the OC 38 such that the fuel reacts with the OC 38 and oxidizes or combusts to increase the temperature of the particulate filter 44 to burn off trapped particulates and regenerate the particulate filter 44 to a condition wherein it can capture substantially more particulates. The amount of fuel injected into the exhaust gases may be controlled as a function of the temperature of the particulate filter and other system parameters, such as mass airflow, exhaust gas recirculation temperatures, and the like so as to control the regeneration of the particulate filter.

An air intake system 52 may be included for delivering fresh air from a fresh air inlet 54 through an air passage to an air intake manifold for introduction of the same into the engine 14. The air intake system 52 may include a charged air cooler 56 to cool fresh air after it has been compressed by the compressor 34. A throttle intake valve 58 may be provided to control the flow of fresh air into the engine. A throttle valve 58 may be manually or electrically operated such as one in response to a pedal position of a throttle pedal operated by the driver of the vehicle.

An exhaust gas recirculation (EGR) system 64 may be provided to recycle exhaust gas to the engine 14 for mixing with the fresh intake air. The EGR system 64 may selectively introduce a metered portion of exhaust gases into the engine 14. For example, the EGR system 64 may be utilized to dilute the incoming fuel charge and low peak combustion temperatures to reduce the amount of oxides of nitrogen produced during combustion. The amount of exhaust gas to be recirculated may be controlled by controlling the EGR valve 66 and/or in combination with other components such as the turbocharger. The EGR valve 66 may be a variable flow valve that is electronically controlled.

The EGR system 64 may include an EGR cooler passage 70, which includes an air cooler 72 and an EGR non-cooler bypass 74. The EGR valve may be provided at the exhaust manifold to meter exhaust gas through one or both of the EGR cooler passage 70 or bypass 74.

A cooler system 80 may be provided for cooling the engine 14 by passing coolant therethrough. The coolant may be sufficient for fluidly conducting away heat generated by the engine 14, such as through a radiator. The cooling system 80 may be operated in conjunction with the heating system 84 which may include a heating cone, heating fan and heater valve. The heating cone may receive heated coolant fluid from the engine 14 through the heater valve so that the heating fan may be electronically controlled 86 by the occupant in the passenger area or cabin of the vehicle and may blow air warm by the heating core into the passenger area or cabin.

A controller 92, such as an electronic control module or engine control module, may be included in the system 10 to control various operations of the engine 14 and other system or subsystem components associated therewith, such as the sensors in the exhaust, EGR and intake systems. Various sensors may be in electrical communication with the controller via input/output ports 94. The controller 92 may include a microprocessor unit (MPU) 98 in communication with the various computer readable storage media via a data or control bus 100 or other communication technique. The computer readable storage media may include any of a number of known devices which function as read only memory 102, random access memory 104, and non-volatile random access memory 106 or other media storage devices. A data, diagnostic, and programming input and output device 108 may also be selectively connected to the controller via a plug to exchange various information therebetween. The device 108 may be used to change values within the computer readable storage media, such as configuration settings, calibration variables, instructions for EGR, intake, exhaust system controls, doser controls and others.

The system 10 may also include an injector mechanism 114 for controlling fuel and/or air injection for the cylinders 18. The injection mechanism 114 may be controlled by the controller 92 or other controller and may comprise any number of functions, including controlling the injecting of fuel and/or air into a common-rail cylinder intake and a unit that injects fuel/or air into a cylinder individually.

The system may include a valve mechanism 116 for controlling the valve timing on the cylinders 18, such as to control airflow into an exhaust flow out of the cylinders 18. The valve mechanism 116 may be controlled by a controller 92 or other controller and may include a number of functions, including selectively and independently opening and closing cylinder intakes and/or exhaust valves. For example, the valve mechanism 116 may independently control the exhaust valve timing of each cylinders such that the exhaust and/or intake valves may be independently opened and closed at controllable intervals, such as with a compression brake.

In one embodiment, the controller 92 may be operated so as to receive signals from various engine/vehicle sensors and execute control logic embedded in the hardware and/software to control various components or the entire system 10. The computer readable storage memory may, for example, include instructions stored thereon that are executable by the controller 92 to perform methods of controlling various components and subsystems of the system 10. The program instructions may be executed by the controller and the MPU 98 to control the various systems and subsystems of the engine and/or vehicle through the input/output ports 94. In general, the dash line shown in FIG. 1 illustrates the optional sensing and control communication between the controller and the various components in the power system. Furthermore, it should be appreciated that any number of sensors or features may be associated with each component in the system for monitoring and controlling the operation thereof.

In one embodiment, the controller 92 may be a DDEC controller available from Detroit Diesel Corporation, Michigan. Various other components of this controller are described in detail on a number of US patents assigned to Detroit Diesel Corporation. Further, the controller may include any of a number of programming and processing techniques or strategies to control any component of the system 10. The system 10 may include more than one controller, such as separate controllers for controlling system or subsystems, including an exhaust system controller to control exhaust gas temperature, mass flow rates, and other components and system parameters.

In one embodiment, the controller 92 or other component, such as a regeneration system controller, may be configured for determining a desired exhaust gas temperature of the exhaust gases exiting the engine to facilitate regeneration of the particulate filter 44 so that particulates captured by the particulate filter 44 are oxidized or otherwise burned. The regeneration of the particulate filter 44 in this manner prevents clogging and filling of the particulate filter 44 so that exhaust gases may pass therethrough with minimal restriction and yet permit additional particulates to be collected.

The desired exhaust gas temperature may be calculated to correspond with other factors and influences of the regeneration process. For example, the desired exhaust gas temperature is intended to refer to the temperature of exhaust gases emitted from the engine 14 that may be used alone or in combination with other control parameters or components to facilitate regeneration, such as in combustion with the temperature influence of a doser 50. The doser 50 may be constructed and arranged to inject a hydrocarbon such as gasoline or diesel fuel into the exhaust gas resulting in oxidation or combustion so that the temperature of downstream components such as the OC 38 and the particulate filter 44 raises. When the temperature of the exhaust gas is sufficiently high, the particulates trapped in the particulate filter 44 are oxidized or combusted.

Figure 2:
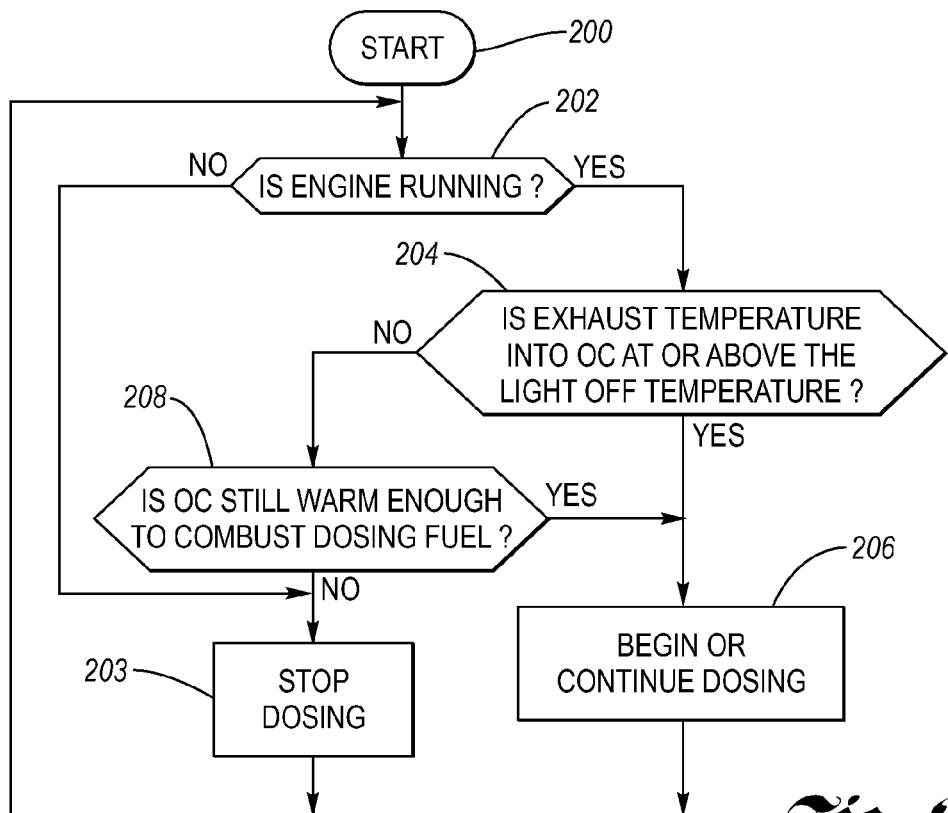
FIG. 2 is a flowchart illustrating a method according to one embodiment of the invention.

One embodiment of the invention includes controlling the system to begin or continue dosing (injecting hydrocarbon fuel into the exhaust gas stream) if one or more operating parameters are met even though the exhaust temperature into the OC 38 is below the OC 38 light-off temperature. Referring now to FIG. 2, an evaluation of the system 10 may be started 200 by determining whether the engine is running 202. If the engine is not running, then dosing is stopped 203. If the engine is running, then a determination is made as to whether the exhaust temperature into the OC 38 is at or above the OC light-off temperature 204. If yes, dosing is begun or continued 206. However, if the exhaust temperature into the OC 38 is not at or above the OC light-off temperature, then a determination is made as to whether the OC 38 is still warm enough to oxidize or combust the dosing fuel 208. If not, the dosing is stopped 203. If the OC 38 is still warm enough to combust the dosing fuel then the dosing is begun or continued.

Figure 3:
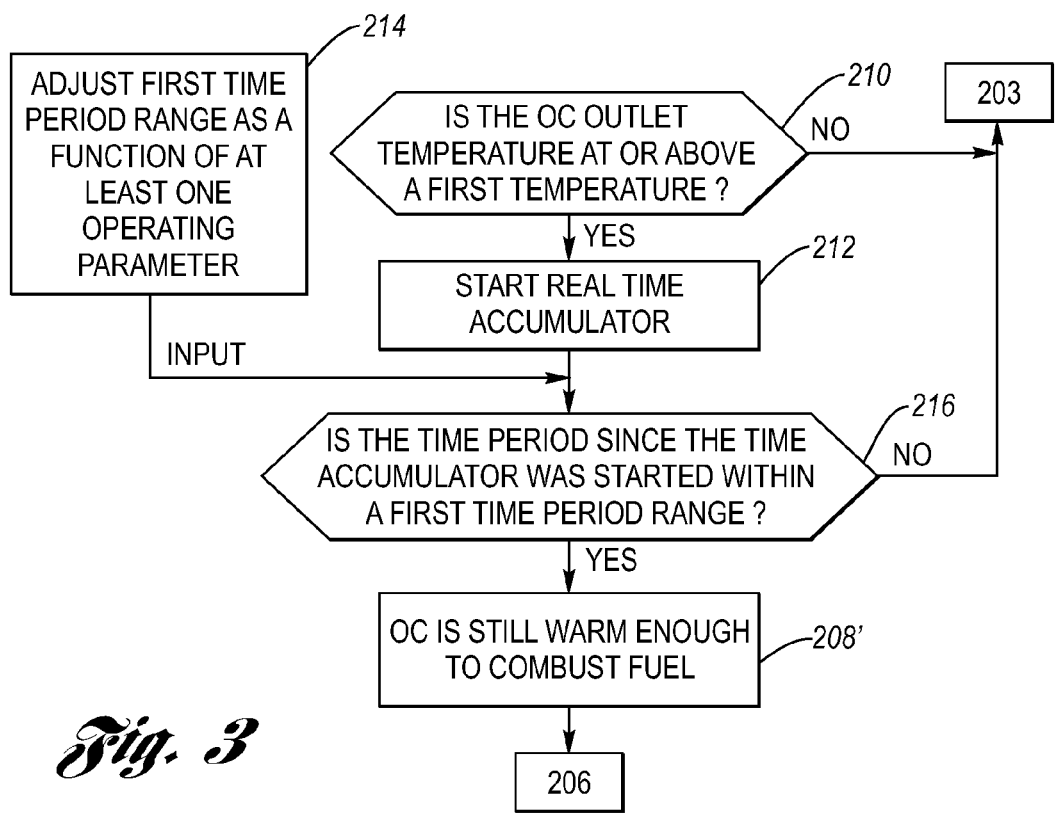
FIG. 3 is a flow chart illustrating a method according to one embodiment of the invention.

Referring now to FIG. 3, in one embodiment of the invention a determination of whether or not the OC is still warm enough to oxidize or combust the dosing fuel 208 may be made by a series of evaluations or determinations. For example, a first determination or evaluation may be made as to whether the OC outlet temperature is at or above a first predetermined temperature 210. If yes, A real time accumulator may be started 212 to measure the time period since it was determined that the OC outlet temperature was at or above the first temperature in step 210 and conditions of step 204 were met. There after, a determination is made as to whether the time period since the time period since the time accumulator was started is within a first time period 216, and if so then it may be concluded that the OC is still warm enough to combust the dosing fuel 208' and therefore dosing may begun or continued 206. The first time period range in 216 may be adjusted as a function of one or more other operating parameters of the system 10. For example the first time period range in 216 may be adjusted based on at least on of engine speed and/or load conditions since exhaust conditions at each condition influence how long the DOC will remain warm even though the inlet temp is below light off. In one embodiment of the invention the method may be carried out so that if the OC inlet temperature goes above light off during conducting the steps of FIG. 2, the operation of the system will return to a normal dosing mode. For example, the operating conditions of the system 10 may be mapped so as to determine which time periods are acceptable since the OC inlet temperature was last above the OC light-off temperature to successfully dose the system 10 with hydrocarbon fuel and so that the hydrocarbon fuel is oxidized or combusted. For example, using such a mapping technique, it may be determined that dosing may began or continued for a period of up to two minutes after the time that the OC inlet temperature was last above the light-off temperature and still result in the injected hydrocarbon fuel being oxidized or combusted. If it has been determined that the time period since the OC inlet temperature was last above the light-off temperature is within a desired first predetermined time period range, it may be determined that the OC is still warm enough to combust the dosing fuel 208, and dosing may begun or continued 206.

The above description of embodiments of the invention is merely exemplary in nature and, thus, variations thereof are not to be regarded as a departure from the spirit and scope of the invention.

What is claimed is:

1. A method of controlling dosing of a hydrocarbon fuel into exhaust gases from an internal combustion engine to facilitate the regeneration of a particulate filter having particulates captured therein, the internal combustion engine having a number of cylinders for internal combustion and producing exhaust gases, an exhaust gas system constructed and arranged to flow exhaust gases therethrough, the exhaust system comprising an oxidation catalyst upstream of a particulate filter constructed and arranged to capture particulates in the exhaust gases, and a doser for injecting hydrocarbons into exhaust gases, the method comprising:

controlling the dosing of a hydrocarbon fuel into the exhaust gases in the exhaust gas system upstream of the particulate filter to oxidize particulates trapped in the particulate filter, comprising determining if the exhaust gas temperature into the oxidation catalyst upstream of the particulate filter is above the light-off temperature for the catalyst, and if so beginning or continuing to dose a hydrocarbon fuel into the exhaust gases upstream of the particulate filter, and if not, determining if the oxidation catalyst is still warm enough to oxidize the dosing fuel, and if so, beginning or continuing to dose the hydrocarbon fuel into the exhaust gas of the exhaust gas system, and if the oxidation catalyst is not still warm enough to oxidize the dosing fuel then stopping the dosing;

wherein determining if the oxidation catalyst is still warm enough to oxidize the dosing fuel comprises determining if an exhaust gas outlet temperature of the oxidation catalyst is at or above a first temperature and measuring a time period since the outlet temperature was at or above the first temperature.

2. The method as set forth in claim 1 wherein the determining if the oxidation catalyst is still warm enough to oxidize the dosing fuel comprises determining whether a time period since an exhaust gas inlet temperature of the oxidation catalyst was last above the light-off temperature of the oxidation catalyst is within a first time period range.

3. The method as set forth in claim 2 further comprising adjusting the first time period as a function of at least one system operating parameter.

4. The method as set forth in claim 2 further comprising adjusting the first time period as a function of at least one of engine speed or engine load.

5. The method as set forth in claim 1 further comprising returning the operation of the system to dosing a hydrocarbon fuel into the exhaust gases if the oxidation catalyst inlet temperature rises to or above the oxidation catalyst light-off temperature.

6. A method of controlling dosing of a hydrocarbon fuel into exhaust gases from an internal combustion engine to facilitate the regeneration of a particulate filter having particulates captured therein, the internal combustion engine having a number of cylinders for internal combustion and producing exhaust gases, an exhaust gas system constructed and arranged to flow exhaust gases therethrough, the exhaust system comprising an oxidation catalyst upstream of a particulate filter constructed and arranged to capture particulates in the exhaust gases, and a doser for injecting hydrocarbons into exhaust gases, the method comprising:

controlling the dosing of a hydrocarbon fuel into the exhaust gases in the exhaust gas system upstream of the particulate filter to oxidize particulates trapped in the particulate filter, comprising determining if the exhaust gas temperature into the oxidation catalyst upstream of the particulate filter is above the light-off temperature for the catalyst, and if so beginning or continuing to dose a hydrocarbon fuel into the exhaust gases upstream of the particulate filter, and if not, determining if the oxidation catalyst is still warm enough to oxidize the dosing fuel, and if so, beginning or continuing to dose the hydrocarbon fuel into the exhaust gas of the exhaust gas system, and if the oxidation catalyst is not still warm enough to oxidize the dosing fuel then stopping the dosing; and wherein the determining if the oxidation catalyst is still warm enough to oxidize the dosing fuel comprises determining whether a time period since the exhaust gas temperature into the oxidation catalyst was last above the light-off temperature of the oxidation catalyst is within a first time period range.

7. The method as set forth in claim 1 wherein the determining if the oxidation catalyst is still warm enough to oxidize the dosing fuel comprises determining whether the time period since the outlet temperature was at or above the first temperature is within a first time period range.

8. The method as set forth in claim 7 further comprising adjusting the first time period range as a function of at least one system operating parameter.

9. The method as set forth in claim 7 further comprising adjusting the first time period range as a function of at least one of engine speed or engine load.

10. A method of regenerating a particulate filter in an exhaust gas system of an internal combustion engine, the method comprising:

passing exhaust gases from the engine through an oxidation catalyst and the particulate filter located in the exhaust gas system while the engine is running, the oxidation catalyst being located upstream of the particulate filter and the particulate filter being constructed and arranged to capture particulates in the exhaust gases;

determining whether an exhaust gas inlet temperature of the oxidation catalyst is at or above a light-off temperature of the catalyst, and if so, dosing a hydrocarbon fuel into the exhaust gases upstream of the particulate filter, and if not, determining whether the oxidation catalyst is still warm enough to oxidize the dosing fuel, and if so, beginning or continuing to dose the hydrocarbon fuel into the exhaust gases, and if the oxidation catalyst is not still warm enough to oxidize the dosing fuel then stopping the dosing, wherein determining whether the oxidation catalyst is still warm enough to oxidize the dosing fuel comprises:

determining whether an exhaust gas outlet temperature of the oxidation catalyst is at or above a first temperature, and if so, beginning or continuing to dose the hydrocarbon fuel into the exhaust gases and starting or continuing to run a real time accumulator to measure a time period since the outlet temperature was at or above the first temperature, and if not, determining whether the time period since the time accumulator was started is within a first time period range, and if so, beginning or continuing to dose the hydrocarbon fuel into the exhaust gases of the exhaust gas system, and if not, then stopping the dosing.

11. The method as set forth in claim 10 further comprising adjusting the first time period range as a function of at least one system operating parameter.

12. The method as set forth in claim 10 further comprising adjusting the first time period range as a function of at least one of engine speed or engine load.

13. The method as set forth in claim 10 further comprising returning the operation of the system to dosing a hydrocarbon fuel into the exhaust gases if the inlet temperature of the oxidation catalyst rises to or above the light-off temperature of the catalyst.

14. A method of regenerating a particulate filter in an exhaust gas system of an internal combustion engine, the method comprising:

passing exhaust gases from the engine through an oxidation catalyst and the particulate filter located in the exhaust gas system while the engine is running, the oxidation catalyst being located upstream of the particulate filter and the particulate filter being constructed and arranged to capture particulates in the exhaust gases;

determining whether an exhaust gas inlet temperature of the oxidation catalyst is below a light-off temperature of the catalyst, and if so, then determining whether an exhaust gas outlet temperature of the oxidation catalyst is above a first temperature, and if so, dosing the exhaust gas with a hydrocarbon, even though the inlet temperature of the oxidation catalyst is below the light-off temperature of the catalyst.

* * * * *